United States Patent [19]

Norrie

[11] Patent Number: 4,829,637
[45] Date of Patent: May 16, 1989

[54] METHOD AND APPARATUS FOR WASHING CARCASSES

[75] Inventor: Lyle W. Norrie, Etobicoke, Canada

[73] Assignee: Knud Simonsen Industries Limited, Ontario, Canada

[21] Appl. No.: 184,669

[22] Filed: Apr. 22, 1988

[51] Int. Cl.⁴ ............................................. A22B 5/08
[52] U.S. Cl. ........................................ 17/51; 17/15
[58] Field of Search ................ 17/15, 51, 11.2, 24

[56] References Cited

U.S. PATENT DOCUMENTS 2,423,930  7/1947  Duff ........................................ 17/24
3,178,763  4/1965  Kolman ................................ 17/1 R Primary Examiner—Willie G. Abercrombie

[57] ABSTRACT

Carcass processing apparatus having an overhead carrier for suspension of carcasses, a carcass conveyor located below the carrier with an angled support surface, the conveyor moving in unison with the carcass along the carrier, and water deluge apparatus for directing a deluge flow of water onto each carcass. Also disclosed is a method of processing carcasses by supporting the carcasses on a moving conveyor located at an angle, for drainage of bodily fluids, and subjecting the carcasses to a continuous deluge flow of water for washing.

16 Claims, 4 Drawing Sheets

METHOD AND APPARATUS FOR WASHING CARCASSES

The invention relates to the processing of animal carcasses with water and, in particular, to the hanging, washing, and scalding of animal carcasses.

BACKGROUND OF THE INVENTION

Animal carcasses, such as for example hog carcasses and the like, soon after slaughter, are hung to allow bodily fluids to drain, are also washed for cleanliness, and are surface scalded to assist removal of body hair. In the case of hogs in particular, the washing step includes the washing of the carcass with hot water, followed by a process known as scalding. The purpose of surface scalding is generally to soften the hair on the carcass so that it may be more readily removed.

In the past, these operations have been carried out usually by first of all hanging the carcass vertically by one leg from a hanging rail for drainage. The carcasses were then taken off the rail and were washed and scalded by simply dipping them in a tank of water. These somewhat rudimentary processing steps are time consuming, relatively inefficient, and do not lend themselves to increased cleanliness. In addition, they also produce some harmful side effects on the carcass, in which the quality of some of the meat may be reduced, at least bacteriologically.

Hanging the carcass by one leg for any length of time is found to result in distortion of the muscle, fat or joint in that leg. It is also found that due to the tension on the muscle in that leg, the draining of body fluids from that muscle is sometimes incomplete. It is felt desirable that the leg muscles of the carcass should be relaxed at some time during this draining stage.

The washing and scalding step, when it is carried out in a tank of water, is not completely satisfactory. In addition, the tank must be emptied and flushed out and refilled regularly, which is expensive, energy inefficient, and labour consuming.

The use of large open tanks of hot water results in substantial energy losses due to heat loss and evaporation, and uneven scalding of the carcasses, and may cause loss of meat product.

It is, therefore, desirable as far as possible that carcasses should be washed in such a manner that all the dirt from each carcass be flushed away, and the surface of the carcass should then be scalded, free of dirt.

In addition, it is desirable to provide for an improved method of hanging the carcasses for drainage, which results in complete drainage, with minimum retention of fluids in the muscles.

It is also clearly desirable that the various steps of hanging, washing, etc., shall be carried out without the requirement for unnecessary handling of each carcass.

In the particular case of the scalding of carcasses, it is desirable for best results that the water shall be at a fairly high temperature in the range of between 55 to 65 degrees.

It is, however, generally considered that if the carcass is subjected to this temperature immediately, or is subjected to this temperature for too great a length of time, that certain undesirable effects can result, causing loss of quality in the carcass and lower grades of certain cuts. On the other hand, if the surfacing scalding is not carried out for a sufficiently long period of time, then the hair is not fully treated, and hair removal will not be completely satisfactory.

It is therefore desirable to find some means whereby these two somewhat conflicting objectives can be satisfied namely, achieving adequate scalding of the carcass so as to ensure satisfactory hair removal, without loss of meat quality.

BRIEF SUMMARY OF THE INVENTION

With a view of achieving these general objectives, the invention comprises a carcass washing and scalding apparatus of the type comprising an overhead carrying rail, means for attaching carcasses for suspension from said rail, carcass conveyor means located below said rail, said conveyor means defining an angled conveyor surface adapted to support each carcass at an angle, and means for moving said conveyor in unison with movement of said carcasses along said rail, and water deluge means arranged for a water delugs onto each carcass in turn.

More particularly, it is an objective of the invention to provide a carcass washing and scalding apparatus having the foregoing advantages wherein the carcass conveyor means is adapted to support a carcass on a first side, for a first predetermined length of said conveyor means, and on a second said side for a second predetermined length of said conveyor means.

More particularly, it is an objective of the invention to provide a carcass washing and scalding apparatus having the foregoing advantages, including first and second carcass conveyor means, which further includes carcass turning means, located between said first and second carcass conveyor means.

More particularly, it is an objective of the invention to provide such a washing and scaling apparatus having a plurality of water treatment zones along said rail, with water flow systems for each said zone, whereby water can be flowed downwardly over said carcasses in each said zone, and temperature control means for each said system in each said zone, whereby water temperatures can be maintained at different levels in different said zones, such heating of the water being accomplished efficiently since the entire apparatus is enclosed in an insulated metal cabinet, thus eliminating evaporation losses to the surroundings as is commonly found currently in dip tank systems employed.

It is a further and related objective of the invention to provide a method of washing and scalding carcasses comprising the steps of supporting said carcasses on moving conveyor means, with said carcasses beind located at a predetermined angle, for drainage of bodily fluids, and subjecting said carcasses to a continuous downward flow of water.

More particularly, it is an objective of the invention to provide a method having the foregoing advantages, wherein said method includes the step of supporting said carcasses a predetermined first angle, for a first processing time, and thereafter supporting said carcasses at a predetermined second angle, for a second predetermined processing time.

The various features of novelty which characterize the invention are pointed out with more particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

IN THE DRAWINGS

DESCRIPTION OF A SPECIFIC EMBODIMENT

As explained above, the invention sets out to perform three basic functions on the carcass, namely the hanging of the carcass to drain bodily fluids, the washing of the carcass and scalding of the carcass. It will be appreciated that these three steps may be carried out in sequence one after the other, or alternatively may be carried out together simultaneously.

For the purposes of the present explanation the invention is described primarily in the form of a processing line for carrying out both drainage, washing and scalding steps in a single chamber.

Figure 1:
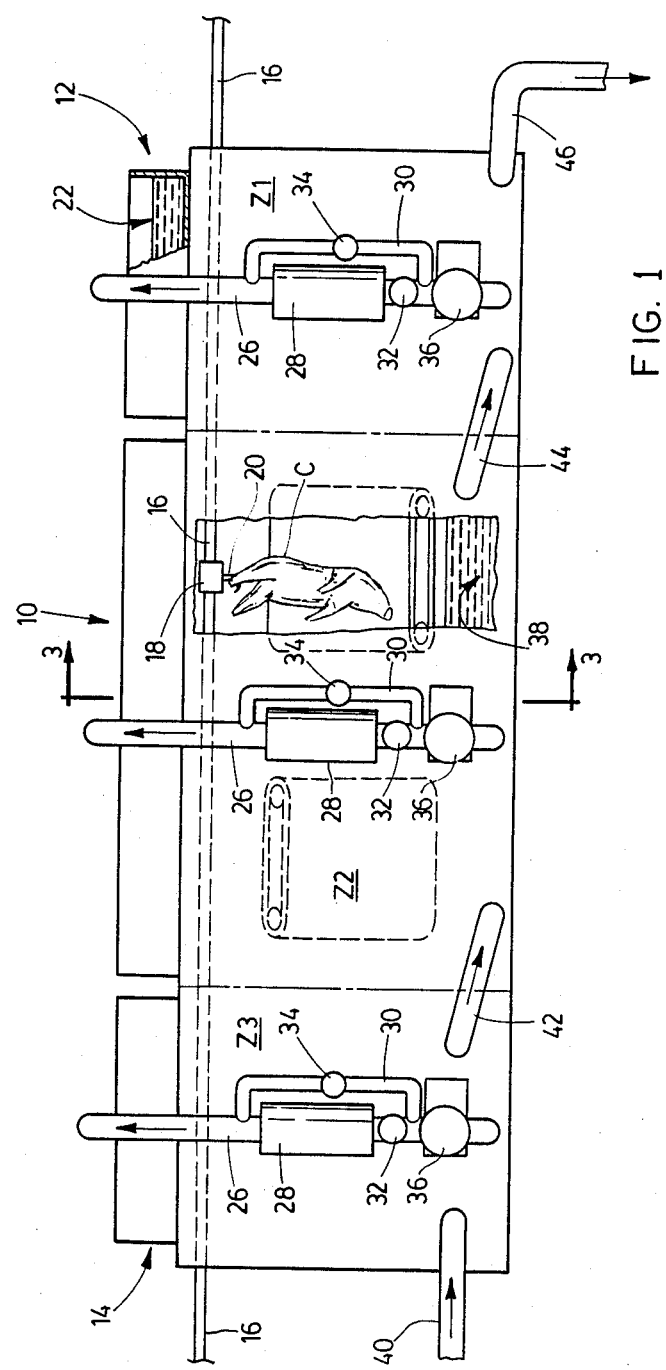
FIG. 1 is a schematic side elevational view of a washing and scalding line in accordance with the invention, partially cut away to reveal its interior.
Figure 2:
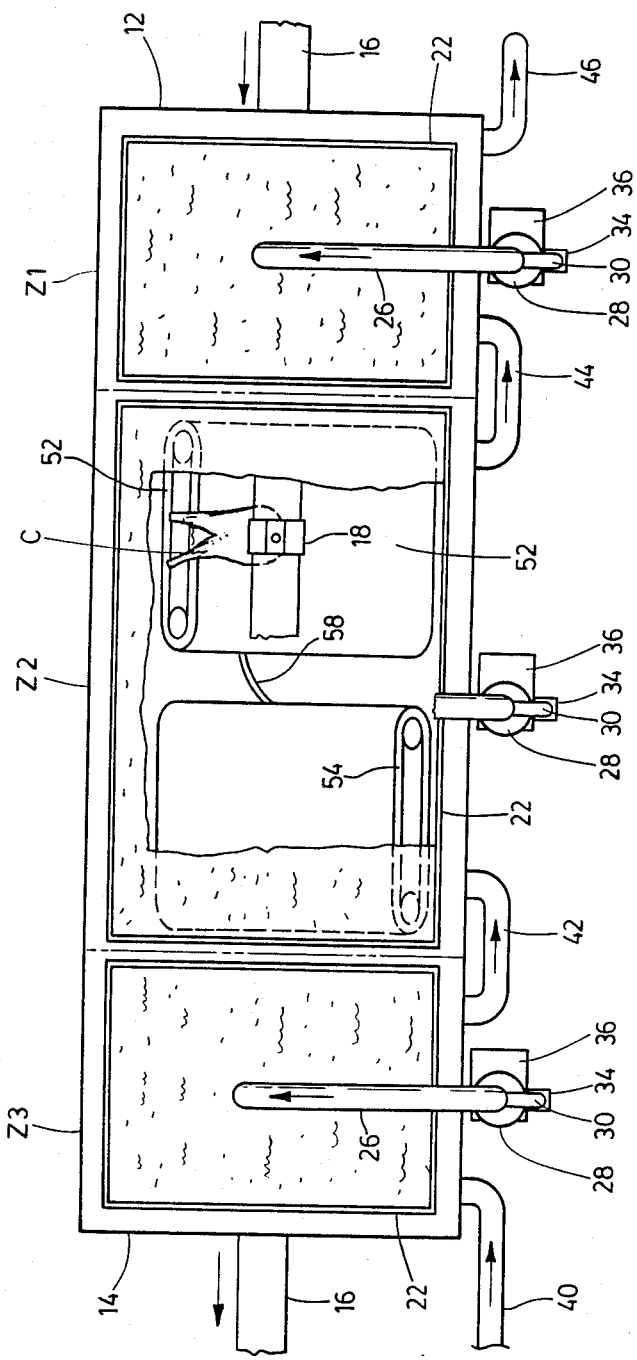
FIG. 2 is a schematic top plan view of the processing line of FIG. 1 partially cut away.
Figure 3:
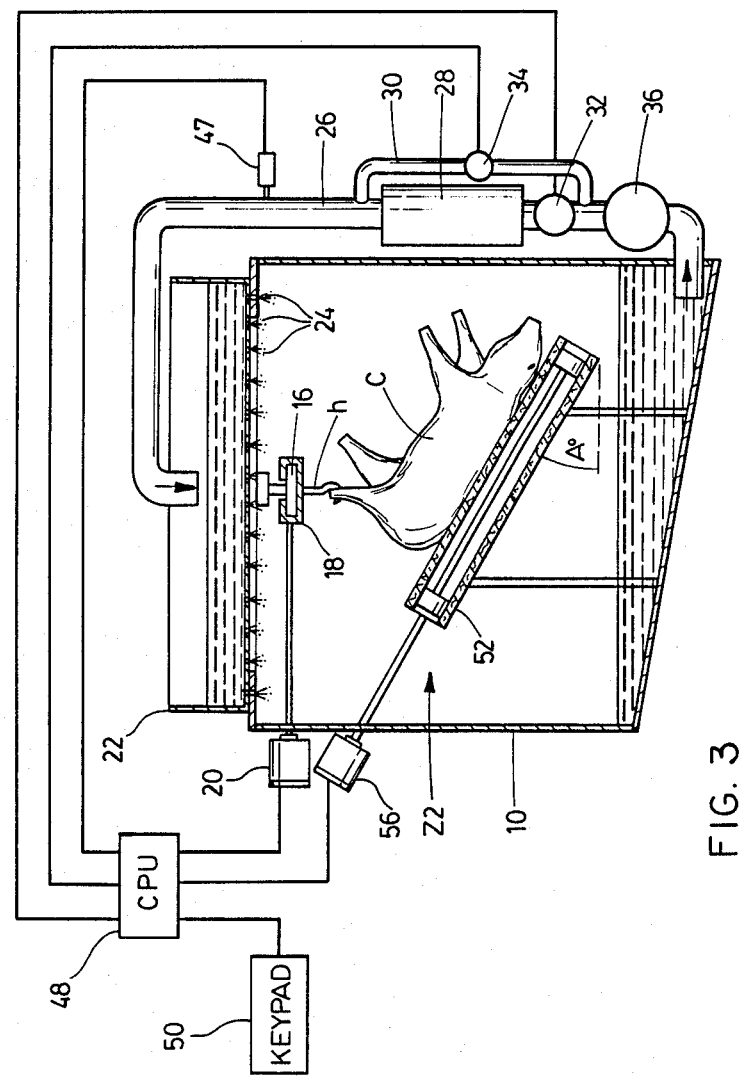
FIG. 3 is a schematic section along the line 3—3 of FIG. 1.

Referring first of all to FIGS. 1 to 3, the invention is illustrated in the form of a processing line consisting of an elongated chamber 10, of generally rectangular cross-section, and of regular shape along its length.

The chamber 10 is is shown here as open at its upstream end 12 and its downstream end 14, but will usually be provided with some form of closures such as doors (not shown), air curtains or the like such as are well known in the art which are omitted here for the sake of clarity.

In order to transport the carcasses indicated generally as C through the chamber 10, a single overhead carrying rail 16 extends through the chamber. Trolleys 18 running on the rail may be moved for example by a chain (not shown) driven by motor 20. Trolleys 18 are provided with some form of carcass engagement means such as shackles or hooks h.

The chamber may be notionally considered as having a plurality of zones, in this case three such zones indicated as Z1, Z2 and Z3. It will be appreciated however that there may be a greater or lesser number of zones, depending upon variations in the processing of particular carcasses, and depending upon user requirements.

The present embodiment of the invention is designed both for draining bodily fluids, and washing the carcass, and scalding the carcass. For this purpose, it is considered desirable that the high temperature water required shall be applied in stages at different temperature levels, in this case three different temperature levels. Accordingly, in this form of the invention, the chamber 10 is provided with three separate water circulation systems.

Each water circulation system consists of a header tank 22, provided with a large number of apertures or openings 24 through which water may stream downwardly in a deluge through chamber 10.

Each water circulation system further comprises a water supply pipe 26, and a heat exchanger 28. A bypass 30 is provided on pipe 26, and one or more flow control valves 32 and 34 control flow either through the heat exchanger 28 or up the bypass 30.

A pump 36 is connected so as to draw water from the sloping floor 38 of the chamber, and force it up through the pipe 26.

Fresh water is admitted via intake pipe 40, into zone Z3. Water flows from zone Z3 to Z2, and from Z2 to Z1, via transfer pipes 42 and 44. Water is discharged via waste pipe 46, from zone Z1, Pumps or flow control valves (not shown) may be provided as needed.

In this way a continuous circulation of water within each zone of the chamber is maintained. The temperature of the water in the particular zone is controlled by means of the heat exchangers and the control valves, and a temperature sensor 47.

In order to control these functions, all of the valves and sensors are connected to a central processing unit 48 which is, in turn, provided with the usual key data entry system 50, which will incorporate numerical displays, or a monitor (not shown). The pumps, heat exchangers, piping, and header tank are designed to be cleaned in place.

In accordance with a further feature of the invention, some of the weight of the carcass is supported by some means in addition simply to the rail and trolley.

Accordingly, in order to achieve this the invention provides a pair of conveyor belts 52 and 54. Conveyor belts 52 and 54 are tilted at an angle indicated generally as A and the belts face towards sides of the chamber. Each of the conveyors 52 and 54, in this particular embodiment, consists of a typical belt conveyor, operated by a motor 56 (shown in FIG. 3 only for the sake of clarity).

The conveyors are shown as located in zone Z2. In this way the carcass weight is partly supported in zone Z2, but hang free in zones Z1 and Z3.

The two conveyors are so located, in relation to the trolleys on the overhead rail, that the carcass, when one leg is attached to the trolley, lies at an oblique angle on the coneyor.

The conveyors and the trolleys will move at the same speed. Motors 20 and 56 are connected to the central processing unit for synchronous movement, for this purpose.

Between the two conveyors 52 and 54, there is a predetermined spacing allowed, for the carcass to hang free and rotate before it is lifted onto conveyr 54.

In order to control the rotation of the carcass, a control rail 58 is provided between conveyors 52-54.

In operation, the carcass of a freshly killed animal is attached by one hind leg on a shackle or hook hanging from a trolley on the overhead rail. The trolley, and carcass will then move into zone Z1. In this zone the carcass hangs vertically, and bodily fluids drain. The carcass is also subject to deluge flow of water for washing. The washing water will be at an elevated temperature but not at the high scalding temperature. This removes dirt, and soaks the hair.

The trolley, and carcass then enter zone Z2. The movement of the trolley along the overhead rail will cause the carcass to be drawn against the conveyor 52, and, movement of the trolley, together with the movement of the conveyor, will gradually lift the carcass onto the conveyor, and cause the carcass to rise into the oblique angle shown, with one side of the carcass lying on the conveyor 52.

In this way, a portion of the weight of the carcass is taken off the leg muscles, leaving them in a better condition.

As the carcass moves through zone Z2, it is subjected to a continuous deluge of water at a higher scalding temperature, flowing downwardly over the length of the carcass.

When the carcass reaches the space between conveyors 52 and 54, it will momentarily swing vertical, after which it will be partly rotated, by engaging the rail 58. The carcass will then be gradually drawn up on to the second conveyor 54, where it will lie on its other side at a second oblique angle, corresponding to the angle of the first cnveyor but directed in the opposite direction, and the carcass is then further subjected to the scalding water deluge.

Due to the relaxing of the leg muscles further minor drainage of body fluids taken place in zone Z2, and the hair is scalded, by the higher temperature water.

The trolley and carcass then move into zone Z3. The carcass again hangs vertical in zone Z3 and is subjected to further deluge of water, at a somewhat lower elevated temperature, for a final wash.

After exiting zone Z3 the carcass is then moved along a rail (not shown) to further procssing in the plant, or may be removed from the rail for further processing.

To achieve the desired scalding treatment, typically being required for removal of hair from hog or other carcasses, the water temperature in the three zones may be carefully controlled and graduated. Thus typically the zone temperatures would be as follows:

Zone Z1: 45 to 60 degrees C
Zone Z2: 55 to 65
Zone Z3: 50 to 60

As noted above, while the embodiment of FIGS. 1 to 3 is shown as comprising both the drainage function and the washing and scalding function in a single installation, it will be understood that in some cases the two basic functions, namely drainage and washing, could be separated.

Figure 4:
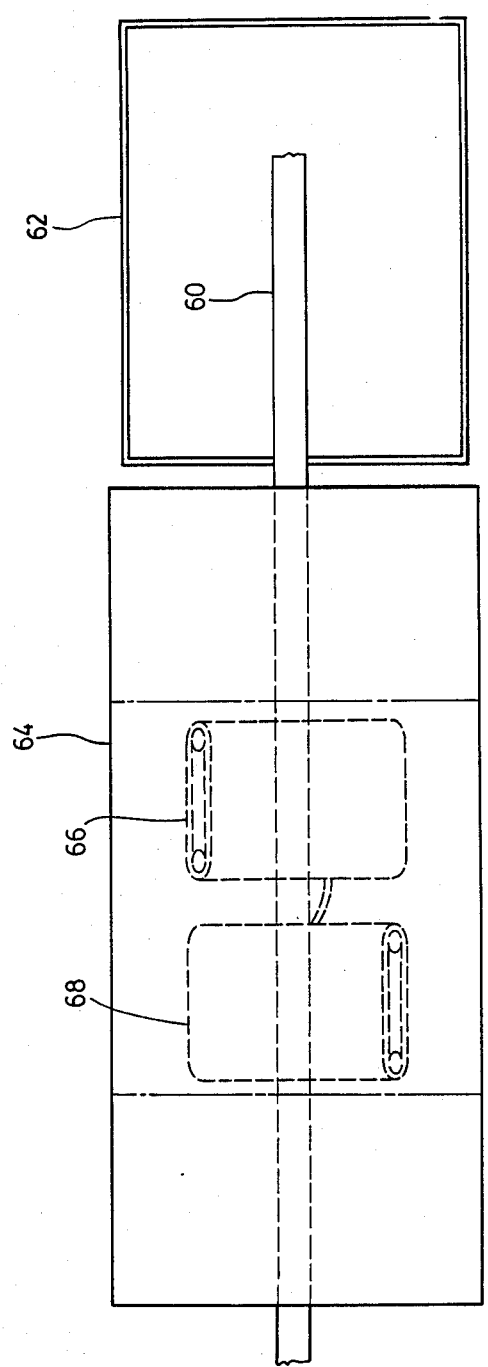
FIG. 4 is a schematic illustration of an alternative processing line.

Thus as shown in FIG. 4, it would be possible to arrange an overhead rail 60 located in a first location over a collector 62 for drainage. The rail would then carry the carcasses to a chamber 64 at a second location wherein there are two angled conveyor belts 66–68, and water deluge systems (not shown). Washing and scalding and residual drainage would take place in the chamber 64.

Collector 62 would have a sloping floor, and a drain 70 would be connected to a valve 72, for directing flow of blood for further processing, or for directing flow to waste, for cleaning.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. Carcass washing and scalding apparatus comprising:
    an overhead carrier, having moveable suspension means for suspension of carcasses from said carrier, for movement therealong;
    carcass conveyor means located below said carrier, said conveyor means defining an angled support surface, adapted to support each carcass at an angle;
    means for moving said conveyor means in unison with movement of said suspension means along said carrier; and,
    water deluge means arranged for directing streams of water onto each said carcass.

2. Carcass washing and scalding apparatus as claimed in claim 1 wherein a first portion of said carcass conveyor means is adapted to support a carcass on a first side and a second portion of said conveyor means supports said carcass on a second said side.

3. Carcass washing and scalding apparatus as claimed in claim 2 which further includes carcass turning means, located between said first and second portions of said carcass conveyor means.

4. Carcass washing and scalding apparatus as claimed in claim 3 and wherein said conveyor means includes two moveable conveyor belts, said conveyor belts defining two conveying support surfaces oriented at two predetermined angles.

5. Carcass washing and scalding apparatus as claimed in claim 1 and including a plurality of water treatment zones, and recirculating water deluge systems for each said zone, whereby water can be flowed downwardly over said carcasses in each said zone and continuously recycled, and water temperature control means for each said zone, whereby water temperatures can be maintained at a predetermined level in each said zone.

6. Carcass washing and scalding apparatus as claimed in claim 4 including a space between said two movable conveyor belts, wherein said carcass may hang vertical, and wherein said carcass turning means is located in said space, whereby to rotate said carcass between said first and second conveyor belts.

7. Carcass washing and scalding apparatus as claimed in claim 5 wherein there is at least one upstream zone, and at least one downstream zone, through which said carcasses move in sequence, and including water collector means in each said zone, and water intake means in said downstream zone, and water transfer means for transferring water from said water collector means of said downstream zone to said water collector means of said upstream zone, and water discharge means in said upstream zone.

8. Carcass washing and scalding apparatus as claimed in claim 1 whenever said carrier passes through at least three processing zones, and wherein said conveyor means is located in the second of said zones.

9. Carcass washing and scalding apparatus as claimed in claim 1 said carrier passes through a collector zone prior to said water deluge means, whereby a major portion of bodily fluids drain in said collector zone prior to reaching said water deluge means.

10. A method of washing and scalding carcasses comprising the steps of:
    suspending a carcass from an overhead carrier, supporting said carcass on moving conveyor means, with said carcass being located at a predetermined angle, for drainage of bodily fluids; and,
    subjecting said carcass to a continuous washing by deluge flow of water.

11. A method of washing and scalding carcasses as claimed in claim 10 including the step of supporting said carcass on a first side at a predetermined first angle, for a first processing time, and thereafter supporting said carcass on a second side at a predetermined second angle for a second processing time.

12. A method of washing and scalding carcasses as claimed in claim 10, including the steps of hanging said carcass from overhead carrier means, for drainage of bodily fluids, and subsequently supporting said carcasses at a predetermined angle on moving conveyor means as aforesaid.

13. A method of washing and scalding carcasses as claimed in claim 12 including the step of subjecting said carcasses to continuous washing deluge of water at a first predetermined elevated temperature, and thereafter subjected said carcasses to scalding with a deluge of water at a second predetermined temperature, said second predetermined temperature being higher than said first predetermined temperature.

14. A method of washing and scalding carcasses as claimed in claim 13 and further including the step of thereafter subjecting said carcasses to a further deluge washing step by downward flow of water at a third predetermined temperature, said third predetermined temperature being less than said second predetermined temperature.

15. A method of washing and scalding carcasses as claimed in claim 10 including the step of supporting each said carcass on first moving conveyor means for a first predetermined time, on a first side of said carcass, thereafter permitting said carcass to hang free of said conveyor means, and rotating said carcass, and thereafter supporting said carcass on second moving conveyor means on a second said side of said carcass, for a second predetermined time.

16. A method of washing and scalding carcasses as claimed in claim 15 wherein said continuous washing step takes place in at least two zones comprising a first zone and a second zone, and including the step of admitting fresh water to said second zone, transferring water from said second zone to said first zone, and discharging water from said first zone.

* * * * *